March 3, 1953     D. G. SMELLIE     2,630,157
METHOD OF MAKING REINFORCED SUCTION CLEANER HOSE
Filed Jan. 10, 1948     4 Sheets-Sheet 1

INVENTOR.
Donald G. Smellie
BY Harry S. Demass
ATTORNEY.

March 3, 1953 — D. G. SMELLIE — 2,630,157
METHOD OF MAKING REINFORCED SUCTION CLEANER HOSE
Filed Jan. 10, 1948 — 4 Sheets-Sheet 2

INVENTOR.
Donald G. Smellie
BY Harry S. Dumarr
ATTORNEY.

March 3, 1953 D. G. SMELLIE 2,630,157
METHOD OF MAKING REINFORCED SUCTION CLEANER HOSE
Filed Jan. 10, 1948 4 Sheets-Sheet 3

INVENTOR.
Donald G. Smellie
BY
Harry S. Dumas
ATTORNEY.

March 3, 1953 D. G. SMELLIE 2,630,157
METHOD OF MAKING REINFORCED SUCTION CLEANER HOSE
Filed Jan. 10, 1948 4 Sheets-Sheet 4

INVENTOR.
Donald G. Smellie
BY Harry S. Dumasse
ATTORNEY.

Patented Mar. 3, 1953

2,630,157

UNITED STATES PATENT OFFICE 2,630,157

METHOD OF MAKING REINFORCED SUCTION CLEANER HOSE

Donald G. Smellie, Canton, Ohio, assignor to The Hoover Company, North Canton, Ohio, a corporation of Ohio Application January 10, 1948, Serial No. 1,569

15 Claims. (Cl. 154—8)

This invention relates to a flexible hose for use with suction cleaners and more particularly to a method of and apparatus for making the same.

A hose for use with suction cleaners must be flexible for ease in manipulating the hand tools and be rigid to resist compressive forces so that it will not collapse when trod upon by the operator.

In order to make hose rigid to compressive forces it has been proposed to seal a reinforcing wire into the walls of the hose between two layers of thermoplastic material. In the past the reinforcing wire has been sealed in the walls of the hose so that it has no freedom of movement with the result that the hose is too rigid and unadaptable to use with suction cleaners. Flexible hose has also been made with a reinforcing wire lying between two layers of thermoplastic material in which the reinforcing wire has freedom of movement but the layers of thermoplastic material can also move relative to each other. If the hose liner is not secured to the covering the liner will collapse due to the suction on the interior of the hose.

According to this invention a reinforcing wire is wound over an inner tube of thermoplastic material, a layer of thermoplastic tape is wound over the wire with its edges overlapping and the overlapping edges are heat-sealed to each other and to the inner tube in such a manner that the reinforcing wire has freedom of movement and the inner and outer layers of thermoplastic material are adhered to each other between the convolutions of the reinforcing wire. According to this invention this process is carried out continuously so as to make a plurality of lengths of hose.

More specifically according to this invention, the plurality of mandrels are provided of a length substantially equal to the length of the hose desired. The mandrels are connected end to end by coupling members in a continuous process and fed longitudinally through an extruding machine whereby an inner layer of thermoplastic material is extruded directly upon the mandrel and the couplings. Immediately after passing through the extruding machine the inner thermoplastic layer is cooled so as to form a tube of thermoplastic material surrounding the mandrels and couplings so that the tube does not adhere to either the mandrels or the couplings. Cooling of the tube also renders the thermoplastic tube sufficiently rigid to support the wire as it is wound about the tube. The connected mandrels with the extruded thermoplastic tube thereon are then passed longitudinally through a winding machine wherein a reinforcing wire and a thermoplastic tape are wound simultaneously over the thermoplastic tube with the tape covering the convolutions of the wire and overlapping at its edges. Simultaneously the overlapping edges are heat-sealed to each other and to the thermoplastic tube by applying a high frequency electric field to the layers. Near the ends of the mandrel the convolutions of the wire are wound closer together to reinforce the hose at the ends where the fittings are to be attached.

Immediately over the couplings the reinforcing wire is wound at a very high pitch whereby the hose including the inner tube, the reinforcing wire and the helically wound tape can be severed at the couplings and the ends turned inside the hose to furnish additional reinforcement for the hose where the couplings are to be attached. The entire foregoing process is carried out by one continuous operation as the mandrels are advanced longitudinally through the apparatus.

Other objects and advantages of this invention will become apparent as the description proceeds when taken in connection with the accompanying drawings in which.

Figure 1A:
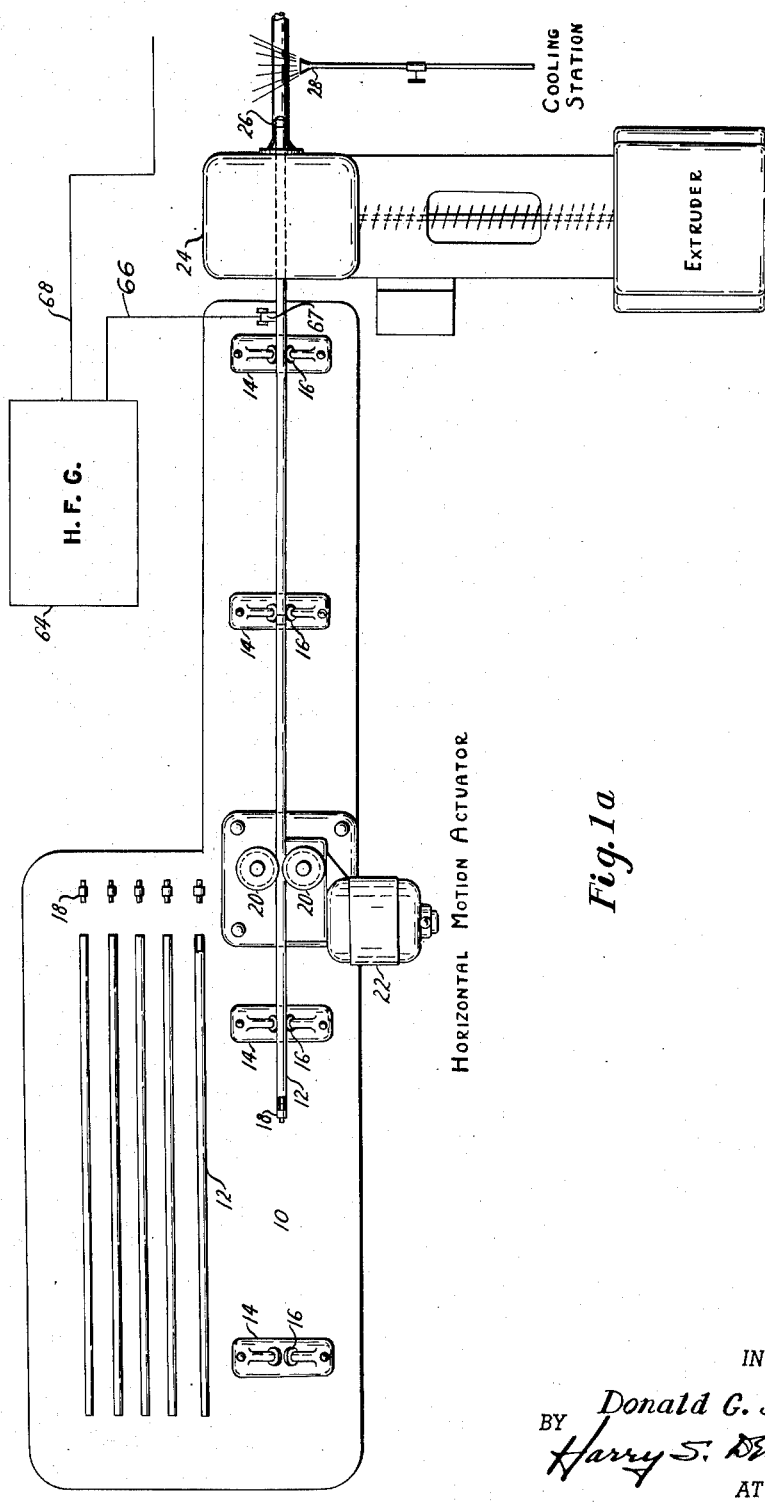
Figure 1a is a plan view of a portion of the apparatus for performing the process of this invention.

Referring to the drawings, the reference numeral 12 represents a plurality of mandrels which are assembled on an assembling station 10. The mandrels 12 are successively connected together in end to end relationship by a plurality of couplings 18 and placed upon the rollers 16 carried by pedestals 14 mounted at the assembling station 10. The end of the first mandrel 12 is then inserted between the rollers 20 driven in any suitable manner by a motor 22. The motor 22 may be a single speed motor or a multi-speed motor as will appear hereinafter.

The rollers 20 advance the mandrels 12 and couplings 18 longitudinally through an extruding machine 24 of any suitable character. In case the motor 22 is a multi-speed motor the motor which drives the extruder 24 should also be a multi-speed motor. In the extruding machine 24 a tube 26 of thermoplastic material is extruded about the mandrels 12 and the couplings 18. The mandrels 12 with the tube 26 of thermoplastic material thereon is then led longitudinally through a cooling station 28 where air is blown upon the thermoplastic tube 26 to set the material so that the tube 26 will not adhere to the mandrels 12 and the couplings 18 and so that the reinforcing wire will not cut through the material of the tube 26.

Figure 1B:
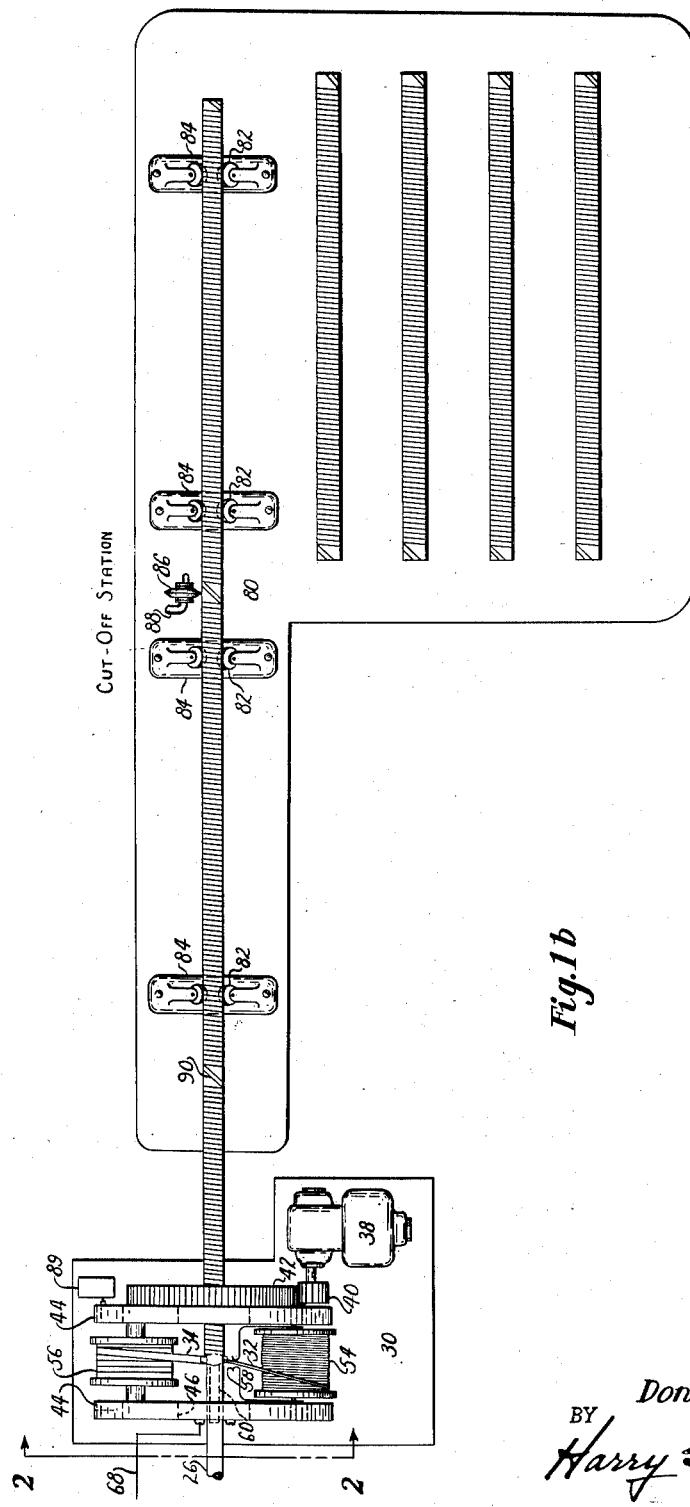
Figure 1b is a plan view of the remainder of the apparatus.
Figure 4:
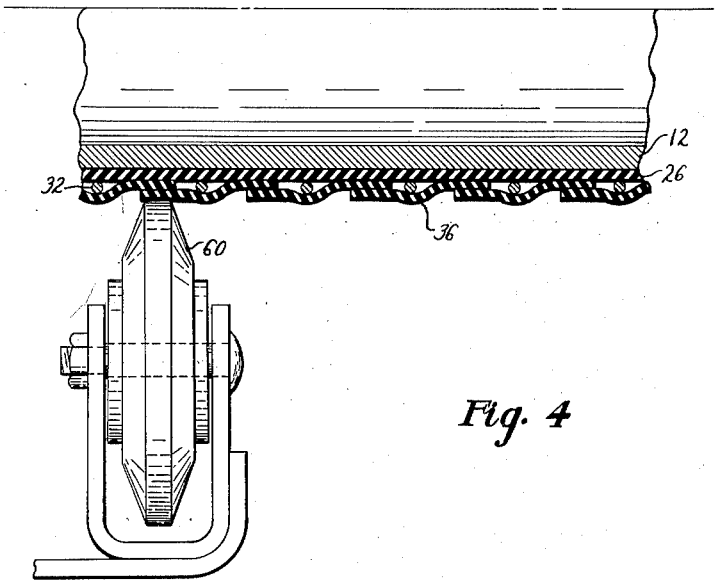
Figure 4 is a cross-sectional view of the body of the hose showing how the overlapping edges of the tape are heat-sealed to each other and to the inner tube.

The mandrels 12 and the couplings 18 with the thermoplastic tube extruded thereover then pass through a winding station 30 (Fig. 1b) where a reinforcing wire 32 is wound helically over the tube 26 and a thermoplastic tape 34 is wound helically over the wire 32 with its edges overlapping as shown at 36 in Fig. 4.

Figure 2:
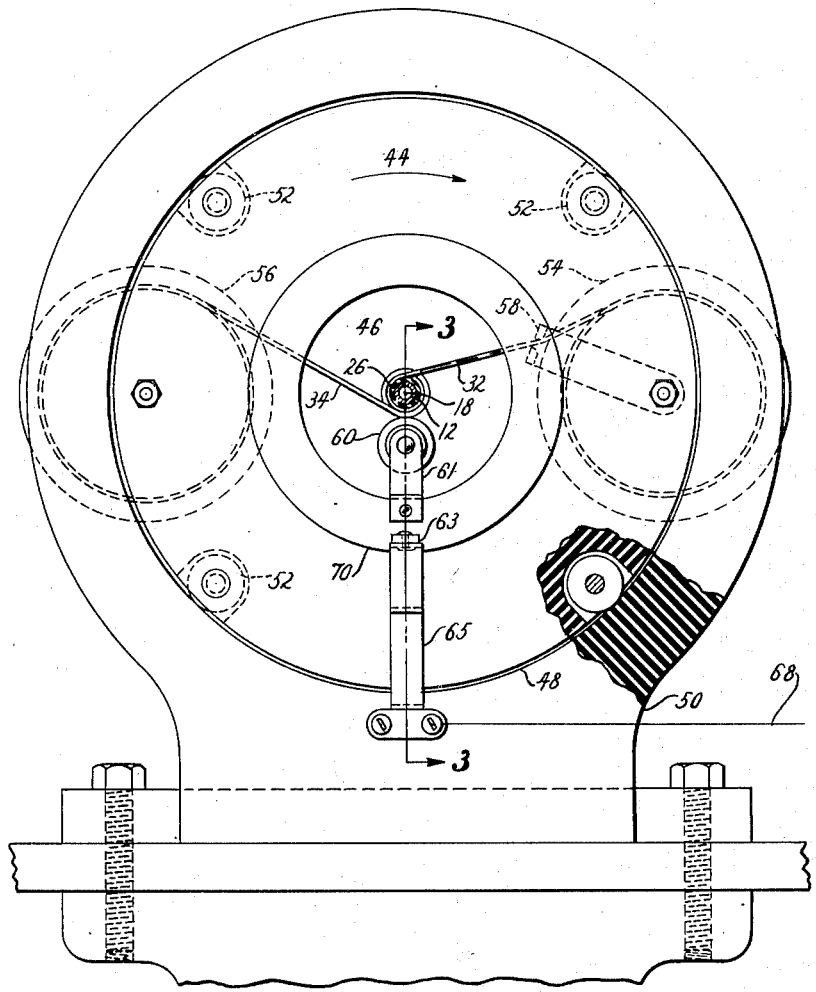
Figure 2 is a detailed view of the winding machine of Fig. 1b, taken on line 2—2 of Fig. 1b, in which the reinforcing wire and the covering plastic tape are wound on the inner tube and the edges of the tape are heat-sealed to each other and to the inner tube between the convolutions of the reinforcing wire.
Figure 3:
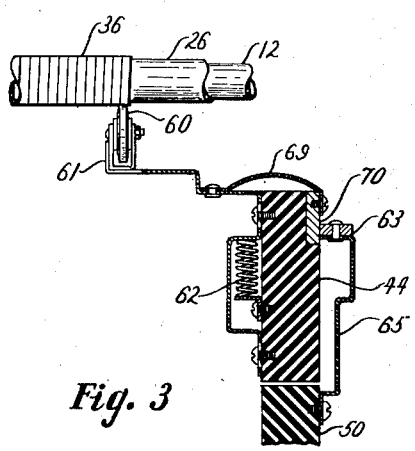
Figure 3 is a detailed view of the electrode roller of Fig. 2 taken on line 3—3 of Fig. 2.

At the winding station 30 a motor 38 drives a pinion gear 40 which is meshed with a gear 42. The gear 42 rotates a pair of ring-shaped plates 44 about the mandrel 12 which extends through openings 46 in the plates 44. As shown in Fig. 2 the plates 44 are mounted for rotation inside a circular track 48 formed on pedestal 50 mounted at the station 30. The plates 44 carry rollers 52 which ride upon the track 48 as the plates 44 are rotated about the tube 26 and the mandrels 18.

Rotatably mounted on and lying between the plates 44 are a pair of reels 54 and 56. The reel 54 carries the reinforcing wire 32 and the reel 56 the thermoplastic tape 34. The plates 44 rotate in the direction of the arrow as shown in Fig. 2 so as to first wind the wire 32 helically over the tube 26 as the mandrel 12 is advanced longitudinally. Simultaneously the tape 34 is wound over the wire 32 with its edges overlapping as shown at 36 of Fig. 4. The reinforcing wire 32 passes through a tensioning device 58 to apply the proper tension to the wire 32 so that it will be wound tightly about the tube 26. The reel 56 has a suitable brake associated therewith to apply the proper tension to the tape 34 as it is wound spirally over the wire 32 with its edges overlapping between the convolutions of the wire 32.

Simultaneously an electrode, preferably in the form of a roller 60, is pressed against the overlapping edges of the tape 34 by the spring 62. The mandrels 12 form one electrode of a high frequency generator 64 (Fig. 1a) by being connected by conductors 66 to a brush type contactor 67 which is pressed against the mandrels 12 in any suitable manner. The roller 60 is connected to the other side of the high frequency generator 64 by a conductor 68, bracket 65, roller contactor 63, conducting ring 70 supported by one of the rings 44 and bracket 61 upon which roller 60 is mounted.

Thus a high frequency electric field is produced in the overlapping edges 36 of the tape and in the tube 26. The overlapping edges 36 of the tape and also the tube 26 are thus dielectrically heated to a plastic condition so that the contacting surfaces of the edges 36 will adhere to each other and to the tube 26 intermediate of the convolutions of the wire 32 because the heating effect will be the greatest at the contacting surfaces. The heat dissipating properties of the mandrel 12 and of the roller 60 is such that the heat produced will be carried away from the outer surface of the tape 34 and the inner surface of tube 26 so that heat will be applied only at the contacting surfaces between the overlapping edges 36 of the tape 34 and of the tube 26. This will heat-seal the overlapping edges 36 of the tape 34 to each other and also will heat-seal the tape to the thermoplastic tube 26.

The hose lengths adaptable for use with suction cleaners are about 9 feet long and about 2 inches in diameter. It has been found that the pitch of the reinforcing wire 32, which is made of medium carbon steel, should be between one-quarter to one-half inch to provide for the proper rigidity and flexibility of the hose.

After passing through the winding station 30 the finished hose passes through a cutting off station 80 in which the hose is supported on rollers 82 mounted on pedestals 84. A rotary knife 86 is advanced towards the hose to sever the finished hose in 9 foot lengths. Thereafter, the finished hose may be removed from the mandrels 12 in any suitable manner.

The ends of the finished hose should be reinforced where the fittings are to be attached. To produce this reinforcement the reinforcing wire 32 is wound closer together at the ends of the 9 foot sections. Over the connectors 18 the wire 32 is wound at a high pitch as shown at 90. Additionally, the end of the thermoplastic material is turned inwardly into the inside of the hose at the ends to produce a finished appearance after the fittings are attached and to additionally reinforce the hose at the ends.

Figure 5:
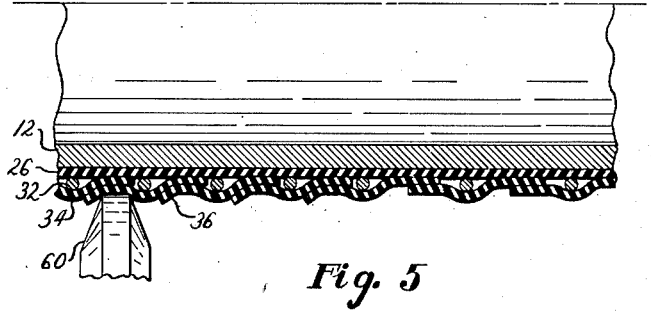
Figure 5 is a cross-sectional view of the hose near its ends where the convolutions of the reinforcing wire are wound closely together.
Figure 6:
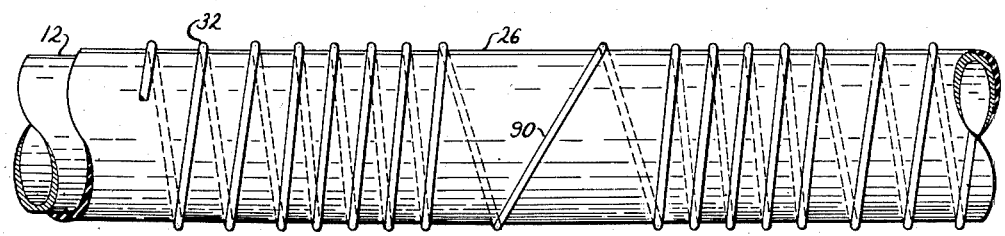
Figure 6 shows how the reinforcing wire is spaced along the length of the hose between two lengths thereof.

Preferably, in order to produce the above results, the motor 38 is periodically speeded up so as to rotate the plates 44 faster about the hose and mandrels so as to wind the reinforcing wire 32 and the tape 34 closer together about the tube 26 at its ends. This result is shown in Fig. 5 where the convolutions of the reinforcing wire 32 are spaced about one-eighth inch apart and the overlapping edges 36 of the tape 34 overlap to a greater extent. The relative spacings of the reinforcing wire 32 along the length of the hose are shown in Fig. 6.

The same result can be produced by slowing down the speed of the advancing motor 22 while the speed of the motor 38 remains constant. As previously pointed out, in such a case the speed of the motor which drives the extruder screw should be correspondingly changed.

After the reinforcing wire 32 is wound in closely spaced loops at the end of the hose, adjacent a coupling 18, the speed of the motor 38 is slowed down so that the plates 44 make about one revolution while the mandrels 18 are advanced about one and one-half inch, corresponding to the length of the couplings 18. This is shown at 99 in Fig. 6. The same result may be produced by increasing the speed of the advancing motor 22 while the speed of the motor 38 remains constant. As the high pitch loop 90 is being formed at the winding station 30 the knife 86 is advanced to sever a 9 foot length of hose at the loop 90 which overlies the couplings 18. The knife 86 is advanced longitudinally of the hose at the same rate as the mandrels 12 are advancing in any suitable manner such as by the guide slot 88.

The foregoing control can be done manually or automatically such as by a counting mechanism 89 (Fig. 1b) which counts the number of revolutions of the plates 44. In the latter case the counting mechanism 89 will count the number of revolutions necessary to produce a 9 foot length of hose. The counting mechanism 89 is connected to a suitable switch mechanism to automatically increase the speed of the motor 38 or reduce the speed of the motor 22 and the extruder motor depending upon the type of control selected. The counting mechanism will then count the number of turns of closely wound wire necessary, after which the switch mechanism will operate to reduce the speed of motor 38 or increase the speed of motor 22 to form a single wide turn 90 of the reinforcing wire 32 immediately over the couplings 18. The counting mechanism will then reduce the speed of motor 22 or increase the speed of motor 38 to form another length of hose with the wires closely spaced. The process will then be repeated to form the normally spaced loops, the closely spaced loops and the high pitch loop 90 so as to form successive lengths of 9 foot hose with a flexible intermediate portion, rigid end portions and a length without substantial reinforcement to be turned inside the finished hose prior to the attachment of the fittings. In the automatic operation of the apparatus the knife may be automatically advanced to sever 9 foot lengths of hose as the high pitch loop 90 is formed. Preferably, the current to the high frequency generator is cut off as the wide loop 90 is formed.

The mandrels 12 are continuously connected in end to end relation by the coupling members 18 and advanced longitudinally by rollers 20 driven by motor 22. The tube 26 of thermoplastic material is continuously formed over the mandrels 12 and coupling members 18 by the extruding machine 24. The mandrels 12 and coupling members 18 with the thermoplastic tube thereon are continuously advanced longitudinally through the winding and heat-sealing station 30. The reinforcing wire 32 and the thermoplastic tape are continuously wound helically over the thermoplastic tube 26, first in closely spaced helical loops, then in widely spaced helical loops, again in closely spaced helical loops and then in a high pitch loop immediately over the coupling members 18. Simultaneously the mandrels 12 and couplings 18 are connected to one side of the high frequency generator 64 so as to form one side of a high frequency electric field. The roller 60 is connected to the other side of high frequency generator to form the other side of the high frequency electric field while the overlapping edges 36 of the thermoplastic tape 34 and the thermoplastic tube 26 immediately beneath the roller 60 forms the dielectric. The high frequency field thus formed heats the contacting surfaces of the tape 34 and the tube 26 to plastic condition so as to heat-seal the inner and outer layers of thermoplastic material, to each other between the convolutions of the loops of the wire 32. As the wide loop 90 is formed on one length of hose the length previously formed is severed at the wide loop 90 by the severing knife 86.

From the foregoing it can be seen that this invention provides a method of an apparatus for constructing 9 foot lengths of flexible hose having an inner layer of thermoplastic material and an outer covering of thermoplastic material and an intermediate reinforcing wire in which the reinforcing wire has freedom of movement relative to both the inner and outer layers.

While I have shown but a single modification of this invention it is to be understood that this modification is to be taken as illustrative only and not in a limiting sense. I do not wish to be limited to the specific structure shown and described but to include all equivalent variations thereof except as limited by the scope of the claims.

I claim:
1. The method of making a flexible hose consisting of the steps of, assembling a thermoplastic tube about a mandrel, winding a reinforcing wire helically about said tube in spaced convolutions, and simultaneously winding a thermoplastic tape about said wire with its edges overlapping between the convolutions of said wire and simultaneously heat-sealing the overlapping edges of said tube to each other and to said inner tube between the convolutions of said wire.

2. The method of continuously making a plurality of lengths of flexible hose comprising, advancing mandrels longitudinally through an extruder to form a tube of thermoplastic material about said mandrels, advancing said mandrels and tube through a winding machine to wind a reinforcing wire helically about said tube and simultaneously winding a thermoplastic tape about said wire with its edges overlapping between the convolutions of said wire while applying a high frequency electric field to said tape and tube between the convolutions of said wire to heat seal the overlapping edges of said tape to each other and to said tube between the convolutions of said wire to form a continuous length of flexible hose and severing said hose into the length desired while continuing to advance said mandrels longitudinally.

3. The method of making a flexible hose comprising, extruding a continuous length of tubing, winding a reinforcing wire about a short length of said tubing in closely spaced helices to form a rigid end portion, winding said wire about a longer length of said tube in widely spaced helices to form the main flexible body of said hose, again winding said wire about a short length of said tube in closely spaced helices to form a second rigid end portion, winding a thermoplastic tape over said wire with its edges overlapping between the convolutions of said wire and simultaneously heat-sealing the overlapping edges of said tape to each other and the inner edge of said tape to said tube between the convolutions of said wire.

4. The method of making a flexible hose according to claim 3 including the step of cutting said hose into lengths by severing the walls of said hose between two short lengths wound with closely spaced helices whereby the ends of said hose lengths are reinforced by said closely wound helices.

5. The method of making a flexible hose comprising, extruding a continuous length of thermoplastic material in the form of a tube, advancing said tube longitudinally at a relatively slow rate while winding a reinforcing wire about said tube at a fixed rate to form closely spaced wire convolutions over a short length of said tube, continuing to wind said wire about said tube at said fixed rate while advancing said tube longitudinally at a medium rate to form medium wide reinforcing wire convolutions about a comparatively long length of said tube, continuing to wind said wire about said tube at the same rate while advancing said tube longitudinally at the first rate to again form closely spaced loops of said wire about a short length of said tube, simultaneously winding a tape of thermoplastic material over the convolutions of said wire with the edges of said tape overlapping between the convolutions of said wire and heat-sealing the overlapping edges of said tape to each other and the lower edge of said tape to said tube between the convolutions of said wire.

6. The method of making a flexible hose comprising, extruding a continuous length of thermoplastic tubing, helically winding a reinforcing wire about a short length of said tubing with its convolutions lying close together, helically winding said wire about a comparatively long length of said tubing with the convolutions lying in wider loops, again helically winding said wire about a short length of said tubing with the convolutions lying close together, winding a high pitch spiral of said wire about said tube in a very wide loop, continuously applying a thermoplastic covering about the convolutions of said wire, continuing the foregoing steps to form a plurality of hose sections having short end portions with a helical reinforcing wire wound in closely spaced loops and an intermediate flexible portion with the convolutions of said wire lying more widely spaced and said sections being separated from each other by a short connecting portion consisting of two layers of thermoplastic material and a high pitch loop of reinforcing wire and severing said hose at said connecting portions to form a plurality of hose lengths.

7. The method of making a flexible hose according to claim 6 in which the steps are carried out while said hose is being advanced axially.

8. The method of making a flexible hose comprising, applying a thermoplastic tube to a mandrel, advancing said tube and mandrel longitudinally at a constant speed, winding a reinforcing wire spirally about a short length of said tube at a high rate of speed so that the convolutions of said wire lie close together, winding said reinforcing wire about a comparatively longer length of said tube at a slower rate so that its convolutions lie in widely spaced loops, again winding said reinforcing wire about a short length of said tube at said high rate of speed so that its convolutions again lie close together and simultaneously applying a thermoplastic cover over the convolutions of said wire.

9. The method of making a flexible hose comprising, applying a thermoplastic tube to a mandrel, advancing said mandrel and tube longitudinally at a constant rate of speed, rotating a spool of reinforcing wire about said mandrel at a speed to wind said wire helically about a short length of said tube with its convolutions lying close together, rotating said spool about said tube at a slower rate so as to wind said wire about a comparatively long length of tubing with the convolutions of said wire lying in widely spaced loops, again rotating said spool about said tube at said first speed so as to form a second short length of tubing in which the convolutions of said wire lie close together and applying a thermoplastic covering over the convolutions of said wire.

10. The method of making a flexible hose comprising, applying a thermoplastic tube to a mandrel, advancing said mandrel and tube longitudinally at a constant rate of speed, rotating a spool of reinforcing wire about said mandrel at a speed to wind said wire helically about a short length of said tube with its convolutions lying close together, rotating said spool about said tube at a slower rate so as to wind said wire about a comparatively long length of tubing with the convolutions of said wire lying in widely spaced loops, again rotating said spool about said tube at said first rate of speed so as to form a second short length in which the convolutions of said wire lie close together, simultaneously winding a thermoplastic tape about the convolutions of said wire with the edges of said tape overlapping between the convolutions of said wire and adhering the overlapping edges of said tape to each other.

11. The method of making a flexible hose comprising, applying a thermoplastic tube to a mandrel, advancing said mandrel and tube longitudinally at a constant rate of speed, rotating a spool of reinforcing wire about said mandrel at a speed to wind said wire helically about a short length of said tube with its convolutions lying close together, rotating said spool about said tube at a slower rate so as to wind said wire about a comparatively long length of tubing with the convolutions of said wire lying in widely spaced loops, again rotating said spool about said tube at the first rate of speed so as to form a second short length in which the convolutions of said wire lie close together and simultaneously winding a thermoplastic tape about the convolutions of said wire and in contact with said tube and with the edges of said tape overlapping between the convolutions of said wire.

12. The method of making a flexible hose comprising, applying a thermoplastic tube to a mandrel, advancing said mandrel and tube longitudinally at a constant rate of speed, rotating a spool of reinforcing wire about said mandrel at a speed to wind said wire helically about a short length of said tube with its convolutions lying close together, rotating said spool about said tube at a slower rate so as to wind said wire about a comparatively long length of tubing with the convolutions of said wire lying in widely spaced loops, again rotating said spool about said tube at said first rate of speed so as to form a second short length in which the convolutions of said wire lie close together, simultaneously winding a thermoplastic tape about the convolutions of said wire and in contact with said tube and with the edges of said tape overlapping between the convolutions of said wire and sealing the lower edge of said tape to said tube between the convolutions of said wire and the overlapping edges of said tape to each other.

13. The method of making a flexible hose comprising, assembling a plurality of mandrels of the same length as that of the finished hose desired, securing the mandrels in end to end relationship by short coupling members, extruding a thermoplastic tube over said mandrels and coupling members, helically winding a reinforcing wire about said tube in closely spaced loops adjacent to said coupling members and in widely spaced loops intermediate said coupling members, applying a thermoplastic covering over the loops of said wire and severing the walls of the hose at said coupling members.

14. The method of making a flexible hose comprising, assembling a plurality of mandrels of the same length as that of the finished hose desired, securing the mandrels in end to end relationship by short coupling members, extruding a thermoplastic tube over said mandrels and coupling members, helically winding a reinforcing wire about said tube in closely spaced loops adjacent to said coupling members and in widely spaced loops intermediate said coupling members, simultaneously winding a thermoplastic tape about the loops of said wire and about said tube with the overlapping edges of said tape lying between the convolutions of said loops, sealing the lower edge of said tape to said tube between the convolutions of said loops and the overlapping edges of said tape to each other and severing the walls of the hose at said coupling members.

15. The method of making a flexible hose in accordance with claim 14 in which said sealing step is carried out by the application of high frequency dielectric heat to the overlapping edges of said tape and to said tube intermediate the convolutions of said loops.

DONALD G. SMELLIE.

REFERENCES CITED

The following references are of record in the file of this patent:

UNITED STATES PATENTS

| Number | Name | Date |
|---|---|---|
| 1,206,230 | Kincaid | Nov. 28, 1916 |
| 1,314,670 | Juve et al. | Sept. 2, 1919 |
| 1,478,083 | Whitmarsh | Dec. 18, 1923 |
| 1,500,797 | Cadden | July 8, 1924 |
| 1,649,808 | Cadden et al. | Nov. 22, 1927 |
| 1,914,455 | Pahl | June 20, 1933 |
| 2,057,789 | Petersen | Oct. 20, 1936 |
| 2,321,064 | Broedling | June 8, 1943 |
| 2,358,909 | Davis | Sept. 26, 1944 |
| 2,430,081 | Roberts et al. | Nov. 4, 1947 |
| 2,442,948 | Bogoslowsky | June 8, 1948 |
| 2,458,563 | Collins | Jan. 11, 1949 |
| 2,474,035 | Crandon | June 21, 1949 |
| 2,502,638 | Becht | Apr. 4, 1950 |
| 2,513,106 | Prendergast | June 27, 1950 |
| 2,539,853 | Meyers et al. | Jan. 30, 1951 |
| 2,551,631 | Pearce | May 8, 1951 |

FOREIGN PATENTS

| Number | Country | Date |
|---|---|---|
| 575,807 | Great Britain | Mar. 6, 1946 |